United States Patent
Santiago-Fernandez et al.

(10) Patent No.: US 11,822,707 B2
(45) Date of Patent: Nov. 21, 2023

(54) SECURE VENTILATION THROUGH PROTECTIVE FLEXIBLE SENSORS

(71) Applicant: International Business Machines Corporation, Armonk, NY (US)

(72) Inventors: William Santiago-Fernandez, Hopewell Junction, NY (US); Russell A. Budd, North Salem, NY (US); James Busby, New Paltz, NY (US); Arthur J Higby, Cottekill, NY (US); Michael Fisher, Poughkquag, NY (US); Silvio Dragone, Olten (CH); Stefano Sergio Oggioni, Besana in Brianza (IT); David Clifford Long, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 17/335,185

(22) Filed: Jun. 1, 2021

(65) Prior Publication Data

US 2022/0382921 A1    Dec. 1, 2022

(51) Int. Cl.
*G06F 21/87* (2013.01)
*H05K 1/02* (2006.01)

(52) U.S. Cl.
CPC .......... *G06F 21/87* (2013.01); *H05K 1/0275* (2013.01); *H05K 2201/10151* (2013.01)

(58) Field of Classification Search
CPC .................. G06F 21/87; H05K 1/0275; H05K 2201/10151
USPC ........................................................ 361/728
See application file for complete search history.

(56) References Cited

U.S. PATENT DOCUMENTS

| | | | |
|---|---|---|---|
| 5,803,803 | A | 9/1998 | O'Dell |
| 8,287,336 | B2 | 10/2012 | Dangler |
| 8,961,280 | B2 | 2/2015 | Dangler |
| 9,578,735 | B2 | 2/2017 | Fisher |
| 9,913,389 | B2 | 3/2018 | Fisher |
| 10,299,372 | B2 | 5/2019 | Dragone |
| 10,512,182 | B2 | 12/2019 | Suzuki |
| 2006/0090918 | A1 | 5/2006 | Dangler |
| 2015/0007427 | A1 | 1/2015 | Dangler |
| 2015/0208521 | A1* | 7/2015 | Seo ............... B32B 38/0008 361/728 |

(Continued)

FOREIGN PATENT DOCUMENTS

| CN | 100492383 C | 5/2009 |
|---|---|---|
| CN | 111194476 A | 5/2020 |

OTHER PUBLICATIONS

International Search Report and Written Opinion, International Application No. PCT/CN2022/091560, International Filing Date May 7, 2022.

*Primary Examiner* — Andargie M Aychillhum
(74) *Attorney, Agent, or Firm* — Jared L. Montanaro; Heather Johnston

(57) ABSTRACT

A tamper detection system may include organic material and a tamper detection circuit embedded in the organic material. A portion of the organic material is ablated away to form an incision in the organic material. A portion of the tamper detection circuit obstructs a fragment of the ablation path. The tamper detection circuit remains intact. The incision enables a gas flow between a first side of the organic material and a second side of the organic material.

7 Claims, 10 Drawing Sheets

(56) References Cited

U.S. PATENT DOCUMENTS

| | | | |
|---|---|---|---|
| 2017/0156223 A1 | 6/2017 | Fisher | |
| 2018/0307863 A1* | 10/2018 | Jackson | H01L 23/3157 |
| 2019/0107452 A1 | 4/2019 | Gunawan | |
| 2020/0226299 A1 | 7/2020 | Rooyakkers | |

* cited by examiner

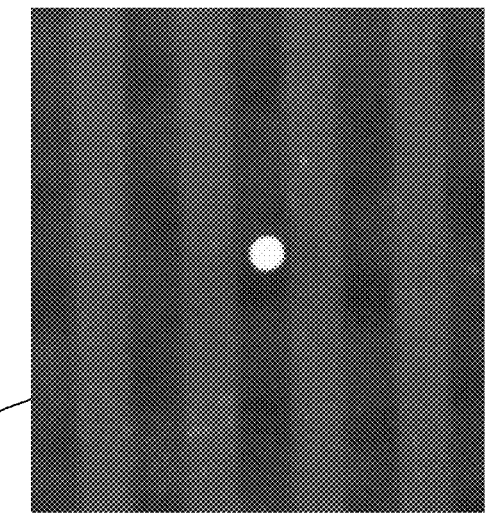
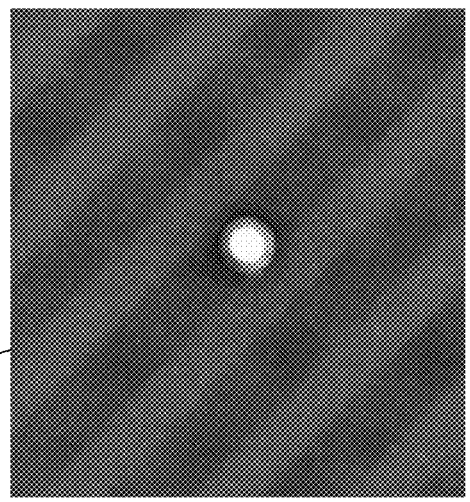
FIG. 4

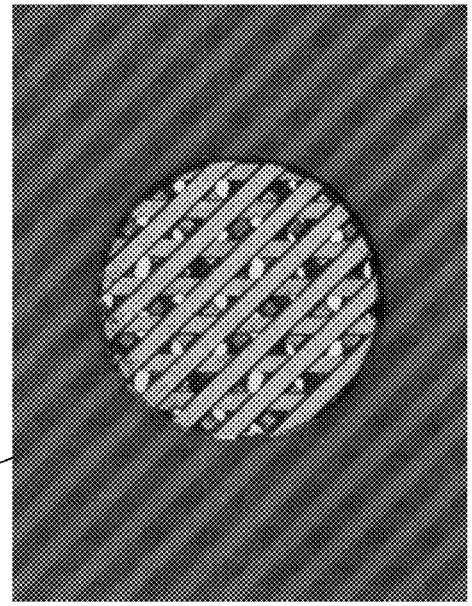
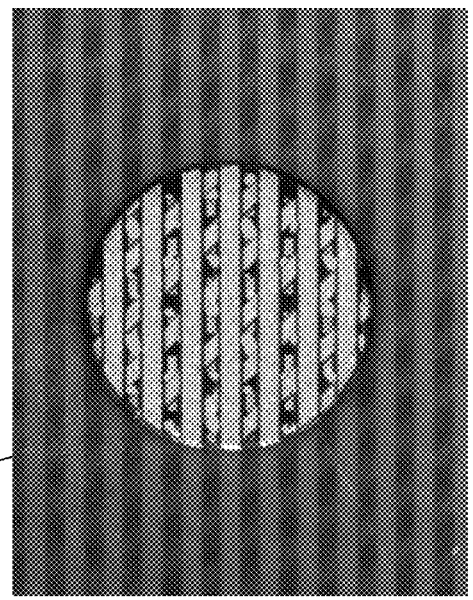
FIG. 5

SECURE VENTILATION THROUGH PROTECTIVE FLEXIBLE SENSORS

BACKGROUND

The present disclosure relates to secure enclosures and more specifically to securing enclosures requiring ventilation.

Secure enclosures may be used to protect contents such as data and/or machinery. Some secure enclosures require ventilation to allow pressure release from inside the secured enclosure. Pressure inside a secure enclosure can result in false tamper detections which may cause unnecessary downtime of related systems. Various constraints of the secure module system, such as physical and mechanical constraints, may make it difficult to include ventilation in secure module enclosures while maintaining the security of the enclosure.

SUMMARY

Embodiments of the present disclosure include a system, method, and computer program product for tamper detection. A tamper detection system may include organic material and a tamper detection circuit embedded in the organic material. A portion of the organic material is ablated away to form an incision in the organic material. A portion of the tamper detection circuit obstructs a fragment of the ablation path. The tamper detection circuit remains intact. The incision enables a gas flow between a first side of the organic material and a second side of the organic material.

The above summary is not intended to describe each illustrated embodiment or every implement of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 4 depicts a material with secure ventilation in accordance with some embodiments of the present disclosure.

FIG. 5 illustrates a material with secure ventilation in accordance with some embodiments of the present disclosure.

Figure 1:
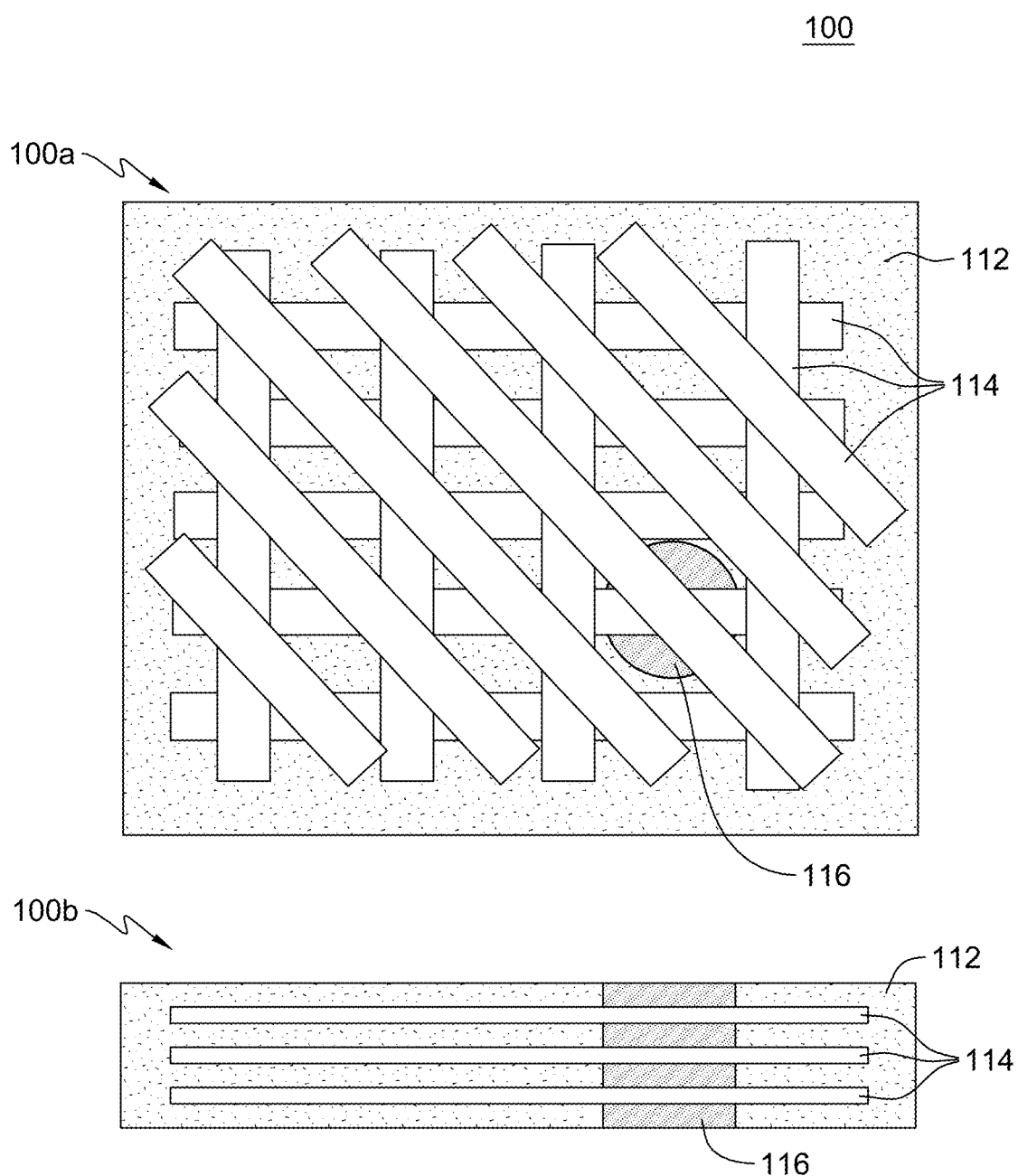
FIG. 1 illustrates a secure ventilation system in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to secure enclosures and more specifically to securing enclosures requiring ventilation.

Secure enclosures are used to protect contents within the enclosure. Some secure enclosures require a mechanism to relieve pressure that may build up within the secured enclosure which, unless effectively mitigated, may result in false tamper detections. Constraints may make it difficult to ventilate a secure enclosure while maintaining the ability of the enclosure to detect and/or discourage tampering.

The present disclosure includes a tamper detection circuit embedded in organic material such that part of the organic material is ablated away to generate a passage from one side of the material to the other side of the enclosure, enabling ventilation while simultaneously maintaining the tamper detection circuit. A tamper detection system in accordance with the present disclosure may include organic material and a tamper detection circuit embedded in the organic material. A portion of the organic material is ablated away to form an incision in the organic material. A portion of the tamper detection circuit obstructs a fragment of the ablation path. The tamper detection circuit remains intact, and the incision enables the flow of gaseous matter between a first side of the organic material and a second side of the organic material.

The present disclosure includes a method for manufacturing a tamper detection system. The method may include obtaining a tamper detection circuit embedded in an organic material and ablating a segment of the organic material to form an incision. Ablating the incision may remove organic material in an ablation path. A portion of the tamper detection circuit may obstruct part of the ablation path. The tamper detection circuit remains intact, and the incision enables a gas flow between a first side of the organic material and a second side of the organic material.

FIG. 1 illustrates a secure ventilation system 100 in accordance with some embodiments of the present disclosure. A top view 100a and a side view 100b of the secure ventilation system 100 are provided.

The secure ventilation system 100 includes an organic substrate 112, an inorganic tamper detection circuit 114, and an aperture 116. The organic substrate 112 may be any organic material, and the tamper detection circuit 114 is suspended therein. The tamper detection circuit 114 may be any metal capable of conducting electrical impulses such that it may identify tampering. The organic substrate 112 may include, for example, a polyimide substrate. The tamper detection circuit may include, for example, copper.

The aperture 116 enables the ventilation of the system such that it permits the flow of fluids between a first side and a second side of the system 100. The aperture 116 is formed through the organic substrate 112 and leaves the tamper detection circuit 114 intact. The aperture 116 may be formed by any means which will permit the ablation of the organic material without harming the electrical integrity of the tamper detection circuit such that an incision may be formed to fluidly connect one side of the system 100 to the other side of the system 100.

Methods that may be used to form the aperture 116 may include, for example, laser ablation and/or chemical ablation. Laser ablation may be used by tuning a laser to ablate the specific organic material used in the organic substrate 112 while not interfering with the tamper detection circuit 114. Chemical ablation may similarly be used by directing chemicals suited to ablating organic material to the substrate to form the desired aperture 116.

In some embodiments, laser ablation may be preferred because a laser may be easier to control the precise outcome of. For example, in some embodiments, a certain angle of the aperture (rather than directly vertical) may be preferred, and the laser may be capable of precise angling. Moreover, using a laser may enable a shadow effect such that substrate behind a portion of the tamper detection circuit 114 may be protected from ablation; in some cases, this may help to prevent the tamper detection circuit 114 from shorting.

Figure 2:
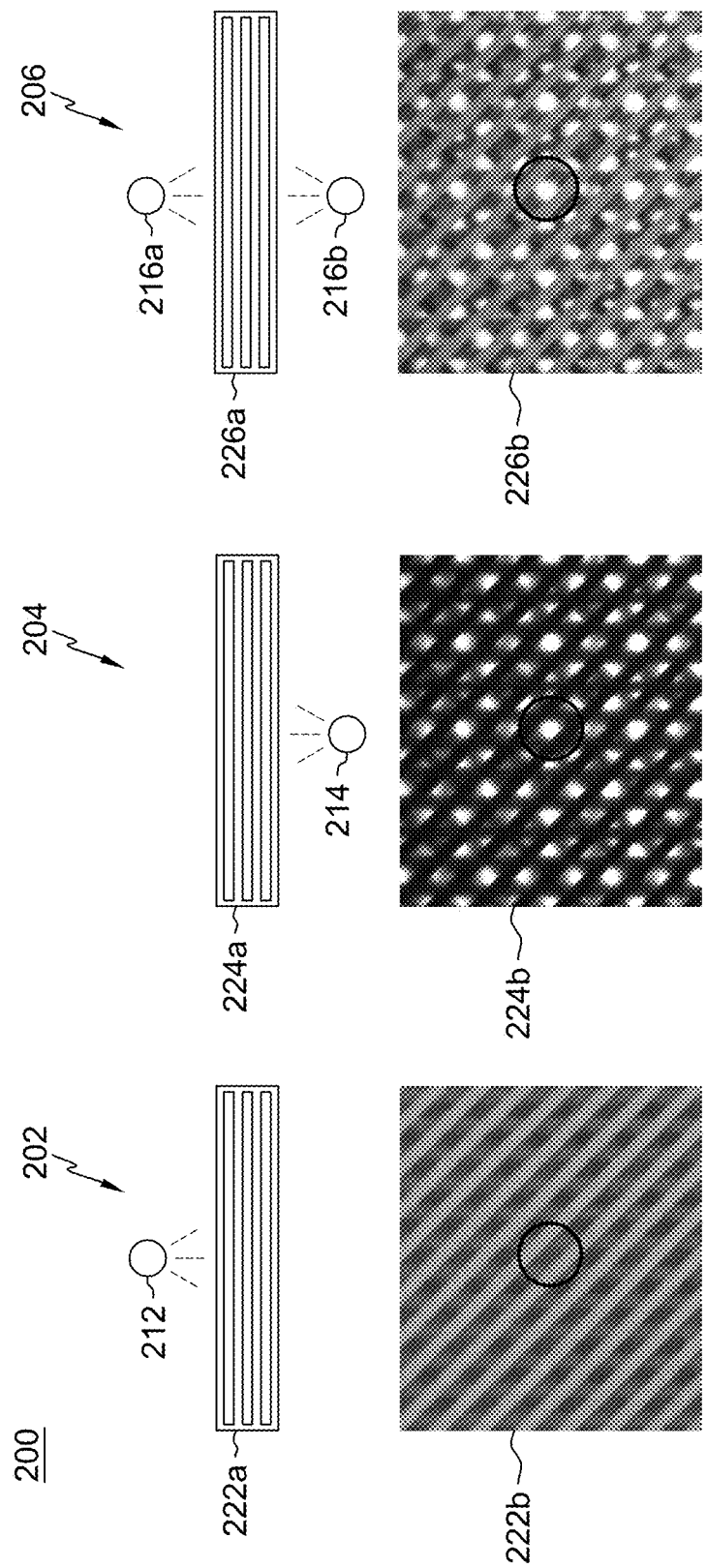
FIG. 2 depicts a material with a secure ventilation mechanism in accordance with some embodiments of the present disclosure.

FIG. 2 depicts a material 200 with a secure ventilation mechanism in accordance with some embodiments of the present disclosure. The material 200 is shown in a first environment 202, a second environment 204, and a third environment 206. In each environment, a side schematic view 222a, 224a, and 226a is shown as well as a top view 222b, 224b, and 226b.

In the first environment 202, a light source 212 is applied over the top of the material 200 as shown in the side view 222a. The top view 222b shows the visibility of the planned incision location in the material under the conditions of the first environment 202. With the light source 212 applied over the material 200, the incision is not obvious and, in some cases, may be invisible to the naked eye. This ability of the incision to be generally invisible increases security as no weaknesses in the material are made obvious by the ventilation mechanism. Further, because in some embodiments the only way to apply a light source to the material 200 would be with an overhead-oriented light source 212, the ventilation system would be generally invisible to an observer.

In the second environment 204, a light source 214 is applied underneath the material 200 as shown in the side view 224a. The top view 224b shows the visibility of the planned incision location in the material under the conditions of the second environment 202. With the light source 214 applied underneath the material, the incision is not obvious because it appears similar to the other spaces between the copper traces. In other words, it is not visibly distinct from the segments of the material 200 that retain the organic substrate. Thus, again, the incision is not made vulnerable.

In the third environment 206, light sources 216 and 216b are applied both over and underneath the material 200 as shown in the side view 226a. The top view 226b shows the visibility of the planned incision location in the material under the conditions of the second environment 202. With the light sources 216a and 216b applied both over and underneath the material, similar to when the light source 214 was applied only underneath the material, the incision is not obvious because it appears similar to the other spaces between the copper traces. In other words, it is not visibly distinct from the segments of the material 200 that retain the organic substrate. Thus, again, the incision is not particularly vulnerable and is protected from an observer identifying a potential weakness in the system.

In some embodiments, the incision may be formed by exposing the tamper detection circuit embedded in the organic material to an organic matter elimination mechanism. The organic matter elimination mechanism eliminates organic matter and does not eliminate inorganic matter. In some embodiments, the organic matter elimination mechanism may be a laser tuned to ablate the organic material while not adversely affecting the tamper detection circuit such that the organic material in a drill path of the laser is removed and the tamper detection circuit in the drill path of the laser remains intact.

Figure 3:
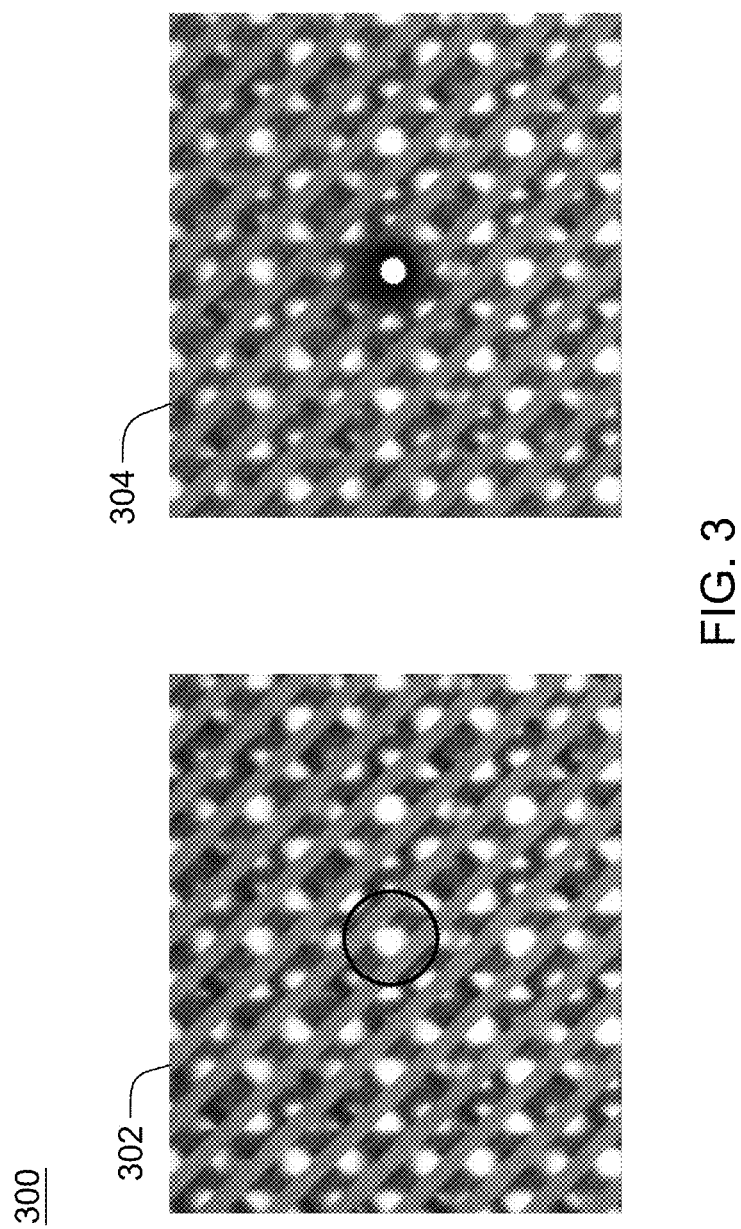
FIG. 3 illustrates a material undergoing a secure ventilation process in accordance with some embodiments of the present disclosure.

FIG. 3 illustrates a material 300 undergoing a secure ventilation process in accordance with some embodiments of the present disclosure. More specifically, the material 300 is shown in a first state 302. In the first state 302, the material 300 has been identified to be used for implementation of the secure ventilation system, and the location of the ablation for ventilation has been identified. The second state 304 shows the material 300 after the incision has been made by ablating away the organic material in the drill path of the laser used to ablate the incision in the material 300.

In many applications, it is preferable to use laser ablation of the organic material because of the ability to precisely decide the shape of the drill path and thus the shape of the incision. A laser should be properly tuned to the specific components (e.g., the substrate and the tamper detection circuit) in the material to be used for ventilation as well as the use case. Tuning the laser to the specific components in the material allows the laser to ablate the organic material while leaving the tamper detection unit intact. Specifically, the electrical integrity of the substrate is to remain intact to enable the material to remain capable of performing sensing detection.

In some embodiments, a multilayer polyimide substrate with copper traces may be used as the secure ventilation material. The copper traces may be referred to as the secure mesh because the copper traces form the tamper detection circuit. In some embodiments, a laser may be used to remove (or laser ablate) the organic material. Various laser wavelengths, from ultraviolet to infrared wavelengths, may be used to laser ablate the organic material while leaving the security traces intact. Similarly, various laser pulse widths, from continuous wave (CW) to femtosecond pulses, may be used to laser ablate the organic material while leaving the security traces intact.

In some embodiments, a radio frequency (RF) laser may be used to ablate the organic material (such as a polyimide substrate) while leaving the tamper detection circuit (such as copper traces) intact. The RF laser may be tuned to a wavelength of 1035 nm, a pulse width of 300 fsec, an amplifier of 1 MHz, a divided mode of 5, a pulse repetition rate (pulse rep rate, or PRR) of 200 KHz, and an RF of 30. The specifications for tuning the laser to other specifications according to the materials used in other embodiments will be recognized by those with skill in the art.

Similarly, the scanner can be set to certain specifications to optimize the performance of the laser ablating the material. In the embodiment referenced above with the polyimide substrate, copper traces, and RF laser, the scanner may be set to a scan speed of 1 M/s, a line spacing of 0.05 mm, and a 10-15 µm (FWHM). Desired scanner specifications for other embodiments will be recognized by those of skill in the art.

FIG. 4 depicts a material 400 with secure ventilation in accordance with embodiments of the present disclosure. The material 400 was ablated by a laser on a first side 402a such that the incision traverses the entirety of the material. The incision is therefore visible on the second side 402b of the material 400. The force of the laser ablating the first side 402a of the material may leave an ablation slope between the incision and the surrounding parts of the material 400.

The width of the drill path of a laser used to ablate the material, and thereby the width of an incision made by the laser in the material, may vary. The width of the incision may impact other factors associated with the ventilation system; specifically, the length of processing time required, the amount of fluid flow through the incision, and how the material is ablated may vary, among other factors. In one embodiment, a ventilation incision may be formed by using a laser to drill a 100 µm diameter through hole in less than four (4) seconds of processing time. In another embodiment, a large ventilation incision (as shown, e.g., in FIG. 5) may have an ablated region with a large width and with the laser ablating from both a first side and a second side to ablate the organic matter within the ablation region to expose through holes between the tamper detection component; more processing time may be required for such an embodiment.

FIG. 5 illustrates a material 500 with secure ventilation in accordance with some embodiments of the present disclosure. Material 500 has a large ventilation incision. Material 500 is shown from a first side 502a and a second side 502b. The incision is started on the first side 502a to start the vent and penetrate halfway through material 500. The incision is then finished from a second side 502b by penetrating the rest of the way through material 500 to form the vent. The material 500 shown uses a polyimide substrate as the organic material and copper traces as the tamper detection circuit. The copper traces are visible in the ablation crisscrossing over one another. Through holes are visible between the copper traces. At these through holes, the polyimide substrate was ablated away by a laser to enable ventilation while preserving the electrical integrity of the detection circuit.

In some embodiments, a large ventilation incision may have an ablated region with a width of 1.5 mm with the laser ablating from both a first side (e.g., the side adjacent the protected assets) and a second side (e.g., the externally-facing side) to ablate the organic matter (e.g., the substrate, such as a polyimide substrate) within the ablation region to expose through holes between the tamper detection component (e.g., the copper traces). In such embodiments, the laser is tuned to remove the substrate without negatively impacting the tamper detection circuit such that spaces between the tamper detection circuit may be ablated away to enable ventilation whereas the electrical integrity of the tamper detection circuit may remain intact.

In some embodiments, maintaining organic material between tamper sensor traces may prevent shorting of the tamper detection system. Laser ablation of a material in accordance with embodiments of the disclosure may leave a shadow behind areas of tamper detection circuit. For example, if a laser ablates away the polyimide substrate and not the copper traces, any copper traces overlaying polyimide substrate will shield the overlaid polyimide substrate from ablation. In other words, a laser tuned to ablate organic matter will not ablate the organic matter behind intervening inorganic matter. The organic matter between tamper sensor traces is thus preserved using this technique.

Figure 6:
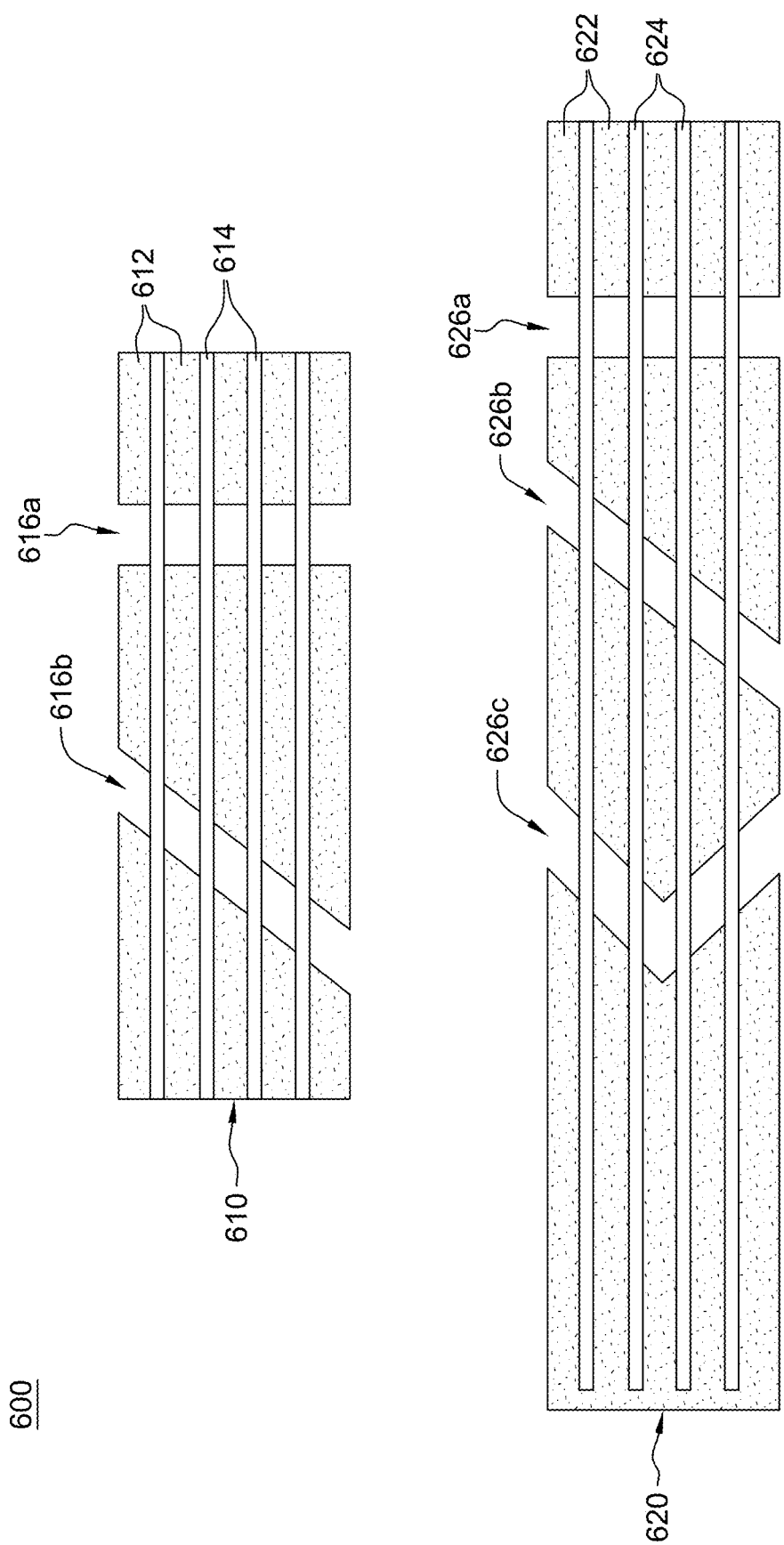
FIG. 6 depicts a schematic of materials with secure ventilation in accordance with some embodiments of the present disclosure.

FIG. 6 depicts a schematic of materials 600 with secure ventilation in accordance with some embodiments of the present disclosure. The schematic of materials 600 shows a first segment 610 of secure ventilation material and a second segment 620 of secure ventilation material. The first segment 610 includes organic material 612 (e.g., a polyimide substrate) and traces 614 (e.g., copper) of a tamper detection system.

The first segment 610 includes a first incision 616a and a second incision 616b. Incisions may be vertical, angled, cornered, or some combination thereof. The incisions must connect a first side (e.g., side facing protected assets) to a second side (e.g., externally-facing side) to enable ventilation (e.g., the flow of gas from one side to the other). In the first segment 610, the first incision 616a is a straight vertical incision. The second incision 616b is an angled incision. In some embodiments, an angled incision such as the second incision 616b may be preferred to increase the difficulty of succeeding in unauthorized access of protected assets.

In some embodiments, the incision may be formed by ablating the material multiple times. A first ablation may be laser-drilled on the first side of the organic material and a second ablation may be laser-drilled on the second side of the organic material. In some embodiments, an angle of the incision formed by the first ablation and the second ablation is between 60° and 120°. The angle of the incision may be where the two ablations meet or intersect.

The second segment 620 of secure ventilation material has organic material 622 (e.g., a polyimide substrate) and traces 624 (e.g., copper) of a tamper detection system. The second segment 620 includes a first incision 626a, a second incision 626b, and a third incision 636c. The first incision 626a is a vertical incision, the second incision 626b is an angled incision, and the third incision 626c is a cornered incision.

In FIG. 6, the vectors (the straight parts of the incision) of the third incision 626c meet approximately at a right angle (90° angle). Other meeting angles may be used in accordance with the present disclosure as long as ventilation is facilitated between the first side of the material and the second side of the material. For example, in some embodiments, a 35° meeting angle may be preferred whereas in other embodiments a meeting angle of 155° may be preferred. In some embodiments of the present disclosure, a precise 90° angle may be preferred; in some embodiments of the disclosure, a range of 60° to 120° meeting angle may be preferred.

Some embodiments may employ multiple cornered incisions. Such embodiments may use the same meeting angle throughout the ventilated material. For example, all incision vectors may meet at approximately an 85° angle. Such embodiments may vary the incision meeting angles. For example, a material with three ventilation incisions may have meeting angles of 102°, 93°, and 24°. Some embodiments may use a combination of unique and replicated meeting angles. For example, a material with four ventilation incisions may have meeting angles of 102°, 93°, 24°, and 93°.

Ventilation incisions may be used once or multiple times in a material. In some embodiments, the ventilating material may be a relatively small component of a secure system. For example, the ventilating material may be embedded in a mechanical can such that there is an opening through the mechanical can on either side of the incision openings; in such an embodiment, it may be preferable to have few incisions (e.g., only one) to minimize the proper opening in the mechanical can. In some embodiments, the ventilating material may be affixed onto the mechanical can rather than affixed inside it; in such embodiments, it may be preferable to have a few incisions (e.g., three) to minimize the size of the opening in the mechanical can while maximizing the ventilation capability of the opening.

In some embodiments, the ventilating material may form the entire secure enclosure. For example, the ventilating material may form a sphere surrounding a polygonal orb suspending a protected asset using magnets affixed to the inside of the triagonal junctions of the polygon. Such an embodiment may use several incisions (e.g., one over the center of various lines in the polygon) to ventilate the protected asset.

In some embodiments, the organic material and the tamper detection circuit embedded in the organic material may fully encapsulate a protected volume. Some embodiments of a tamper detection system may further include a mechanical can. The mechanical can may include a mechanical opening. The tamper detection circuit embedded in the organic material may be affixed over the mechanical opening of the mechanical can. In some embodiments, a tamper detection method in accordance with the present disclosure may include affixing the tamper detection circuit embedded in the organic material to a mechanical can. The mechanical can may include a mechanical opening, and the tamper detection circuit embedded in organic material may be affixed over the mechanical opening of the mechanical can.

Figure 7:
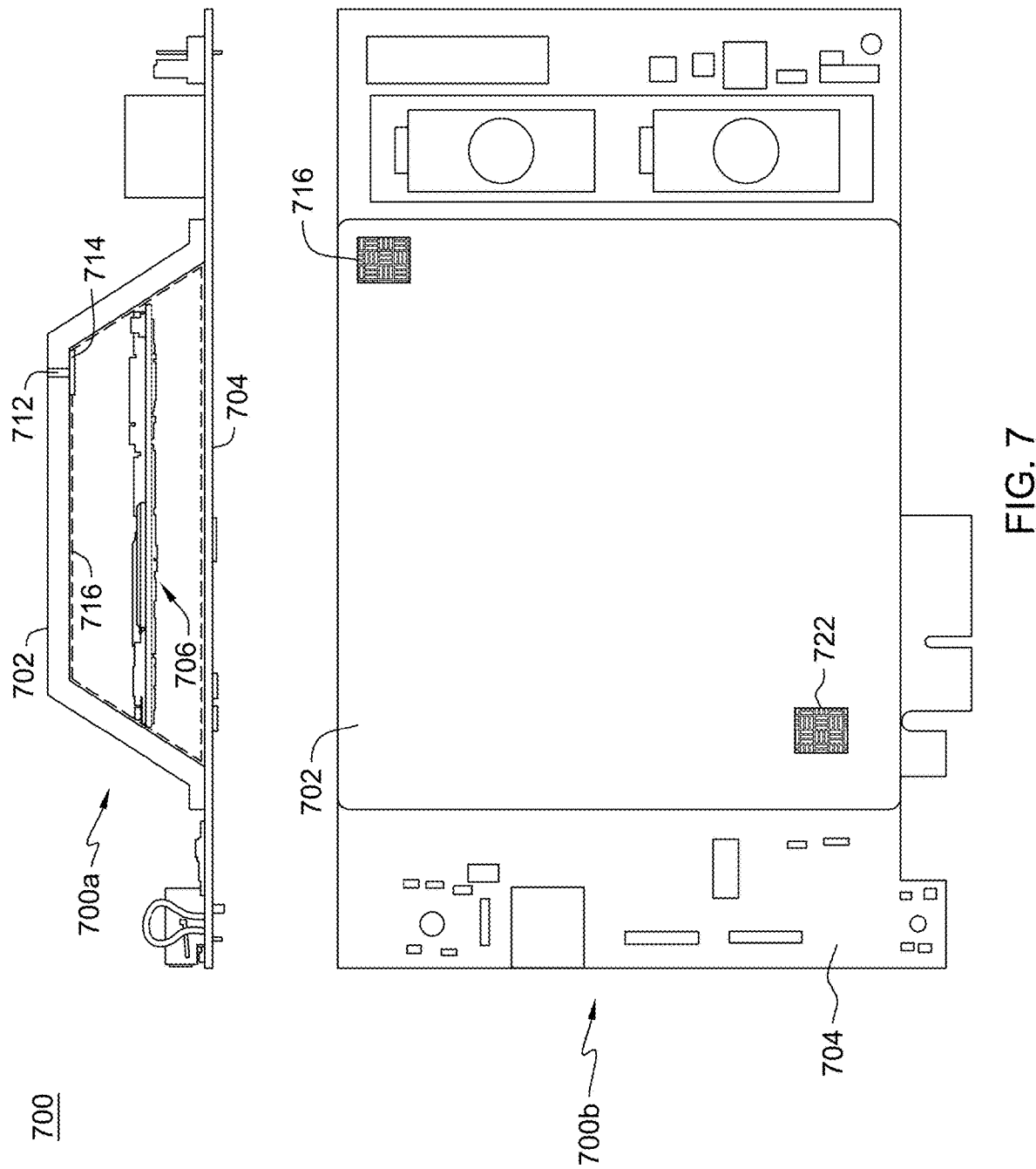
FIG. 7 illustrates a system utilizing material with secure ventilation in accordance with some embodiments of the present disclosure.

FIG. 7 illustrates a system 700 utilizing material with secure ventilation in accordance with some embodiments of the present disclosure. A first viewpoint is shown of a cross-sectional view 700a of the system 700 and a second viewpoint is shown of a top-down view 700 of the system 700.

The system 700 includes a mechanical can 702 connecting to a circuit board 704 around a protected asset 706. The mechanical can 702 has a mechanical opening 712. The mechanical opening 712 may be, for example, a hole through the mechanical can 702. Ventilating material 714 is attached to the mechanical can 702 on the side with the protected asset 706. The system 700 further includes a tamper sensor 716 extending around the entire inside perimeter of the mechanical can 702.

In this embodiment, the ventilating material 714 is on the protected asset 706 side of the tamper sensor 716. In other embodiments, the ventilating material 714 may be between the tamper sensor 716 and the mechanical can 702 or integrated as a cohesive unit with the tamper sensor 716. For example, the tamper sensor 714 may be embedded in the organic matter in the ventilating material 714; in such an embodiment, the organic matter of the ventilating material may cover a portion or the entirety of the tamper sensor 716.

The system 700 is also shown with a top-down view 700b. The top-down view 700b shows the mechanical can 702, the circuit board 704, and the tamper sensor 716 through the mechanical opening 712 in the mechanical can 702. The top-down view 700b shows a second mechanical opening 712 in the mechanical can 702. In this embodiment, the tamper sensor 716 extends around the entire protected asset; as such, the tamper sensor 716 is visible through both the mechanical opening 712 and the second mechanical can opening 722.

In some embodiments, the tamper detection system may further include a wire trap affixed to the first side of the organic material adjacent the incision. The wire trap may include a tamper detection sensor and a bond component. The tamper detection sensor may be attached to the organic material via the bond component. The bond component may physically separate the tamper detection sensor from the organic material.

Figure 8:
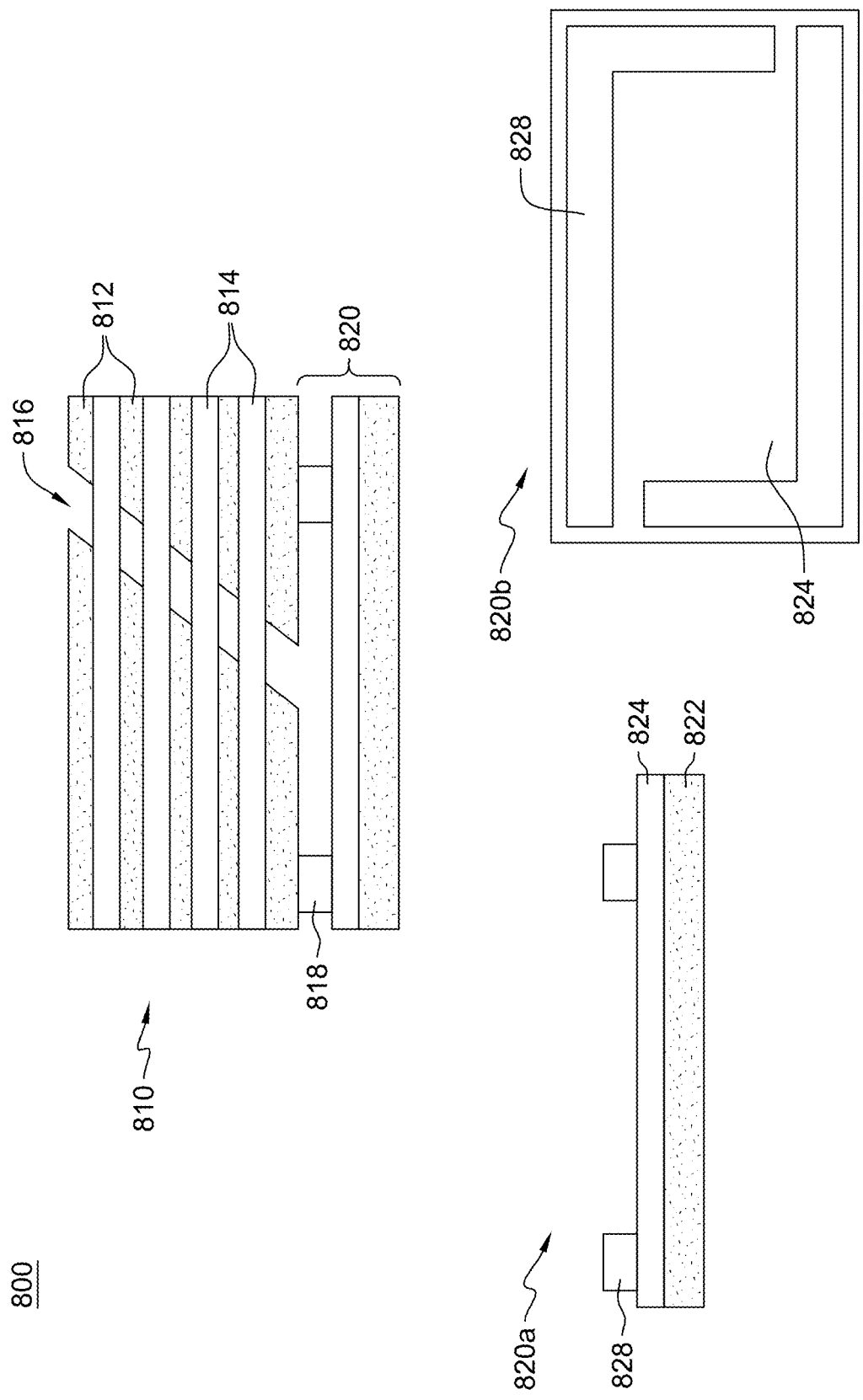
FIG. 8 depicts a schematic of a material with secure ventilation in accordance with some embodiments of the present disclosure.

FIG. 8 depicts a schematic of material 800 with secure ventilation in accordance with some embodiments of the present disclosure. The schematic of material 800 shows a wire trapped ventilation material 810 as well as a sliced side view 820a and a top view 820b of the wire trap 820. The wire trapped ventilation material 810 includes organic material 812 and tamper detection traces 814. The wire trapped ventilation material 810 includes an angled ventilation incision 816. The wire trapped ventilation material 810 further includes a wire trap 820.

The wire trap 820 is shown with a sliced side view 820a and a top view 820b. The wire trap 820 has a tamper sensor 824. The tamper sensor 824 may include a solid metal plate or copper weave as part of a tamper detection circuit. In some embodiments, the tamper sensor 824 may include a solid segment of non-breathable material (e.g., a copper plate) because ventilation may occur around the bond component 828. The bond component 828 may physically separate the wire trap 820 from the rest of the ventilation material 810 such that fluids (e.g., air) may flow between the wire trap 820 and the rest of the ventilation material 810.

In this embodiment, the tamper sensor 824 is on an organic base 822 (e.g., a polyimide substrate). In some embodiments, the tamper sensor 824 may exist independent of an organic base 822.

The top view 820b of the wire trap 820 shows that the bond component 828 is in an L-shape on the tamper sensor 824. The bond component 828 may be in any shape that permits the flow of fluids between the wire trap 820 and the rest of the ventilation material 810. For example, in some embodiments, the bond component 820 may include one or more pillars of bonding segments that connect the tamper sensor 824 to the rest of the ventilation material 810.

Figure 9:
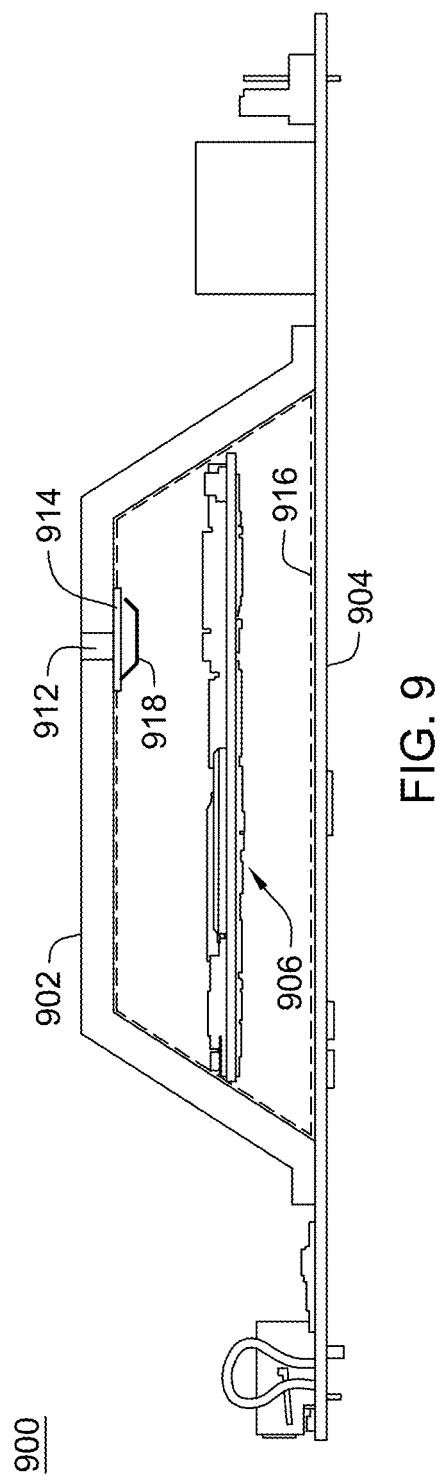
FIG. 9 illustrates a system utilizing material with secure ventilation in accordance with some embodiments of the present disclosure.

FIG. 9 illustrates a system 900 utilizing material with secure ventilation in accordance with some embodiments of the present disclosure. The system 900 includes a mechanical can 902 connecting to a circuit board 904 around a protected asset 906. The mechanical can 902 has a mechanical opening 912. The system 900 further includes a tamper sensor 916 extending around the entire inside perimeter of the mechanical can 902. Ventilating material 914 is attached to the mechanical can 902 on the side with the protected asset 906. A wire trap 918 is attached to the ventilating material 914 between the ventilating material 914 and the protected asset 906.

Figure 10:
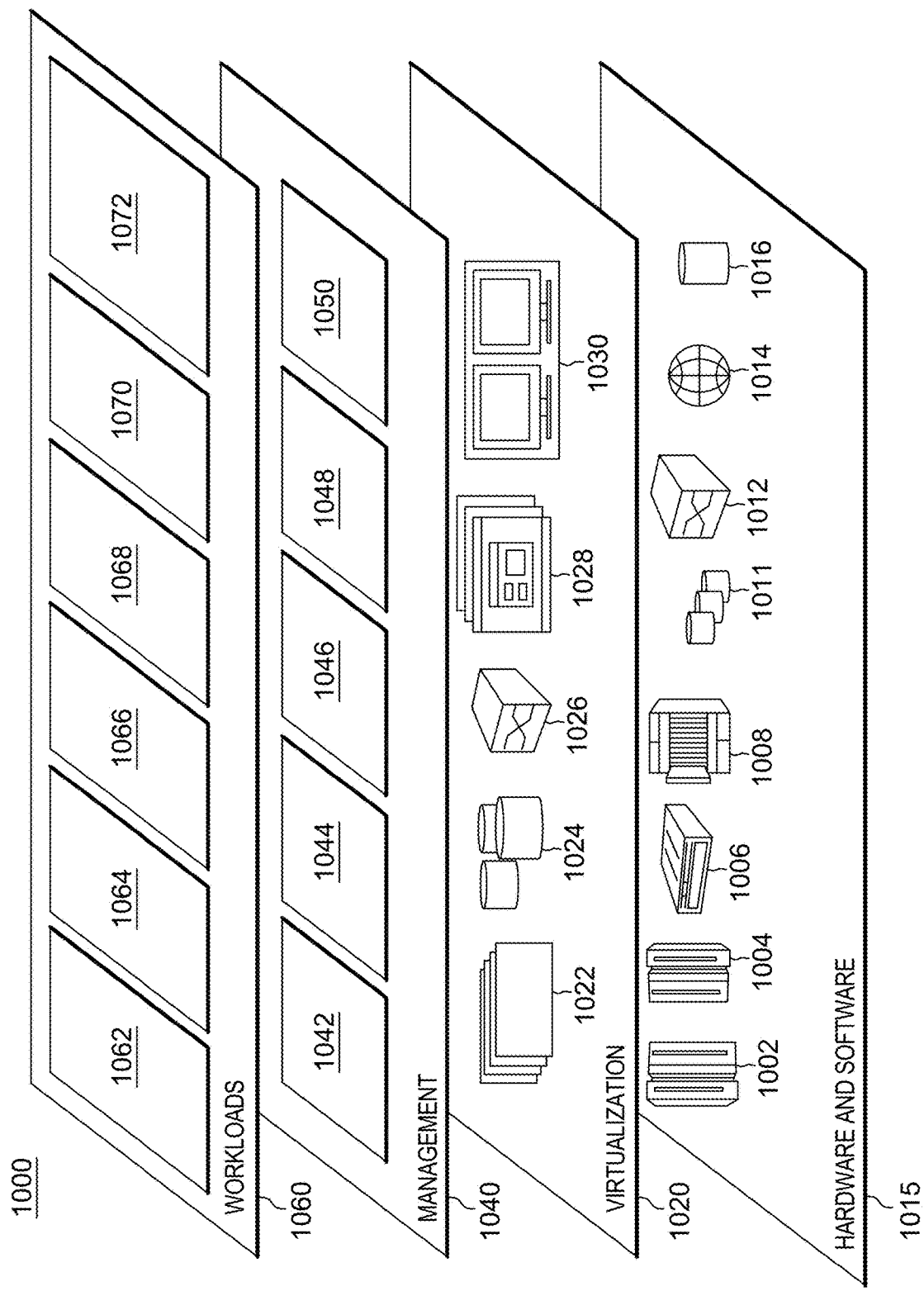
FIG. 10 depicts a high-level block diagram of an example computer system that may be used in implementing one or more of the methods, tools, and modules, and related functions in accordance with some embodiments of the present disclosure.

FIG. 10 depicts a high-level block diagram of an example computer system that may be used in implementing one or more of the methods, tools, and modules, and related functions in accordance with some embodiments of the present disclosure. It should be understood in advance that the components, layers, and functions shown in FIG. 10 are intended to be illustrative only and embodiments of the disclosure are not limited thereto. As depicted below, the following layers and corresponding functions are provided.

Hardware and software layer 1015 includes hardware and software components. Examples of hardware components include: mainframes 1002; RISC (Reduced Instruction Set Computer) architecture-based servers 1004; servers 1006; blade servers 1008; storage devices 1011; and networks and networking components 1012. In some embodiments, software components may include network application server software 1014. The hardware and software layer 1015 may further include a tamper detection system with secure ventilation 1016.

Virtualization layer 1020 provides an abstraction layer from which the following examples of virtual entities may be provided: virtual servers 1022; virtual storage 1024; virtual networks 1026, including virtual private networks; virtual applications and operating systems 1028; and virtual clients 1030.

In one example, management layer 1040 may provide the functions described below. Resource provisioning 1042 provides dynamic procurement of computing resources and other resources that are utilized to perform tasks within the cloud computing environment. Metering and pricing 1044 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 1046 provides access to the cloud computing environment for consumers and system administrators. Service level management 1048 provides cloud computing resource allocation and management such that required service levels are met. Service level agreement (SLA) planning and fulfillment 1050 provide pre-arrangement for, and procurement of, cloud computing resources for which a future requirement is anticipated in accordance with an SLA.

Workloads layer 1060 provides examples of functionality for which the cloud computing environment may be utilized. Examples of workloads and functions which may be provided from this layer include: mapping and navigation 1062; software development and lifecycle management 1064; virtual classroom education delivery 1066; data analytics processing 1068; transaction processing 1070; and a tool for generating data 1072.

Although the present disclosure has been described in terms of specific embodiments, it is anticipated that alterations and modification thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A tamper detection system, said system comprising: organic material; and a tamper detection circuit embedded in said organic material, wherein a portion of said organic material is ablated away to form an incision in said organic material, wherein a portion of said tamper detection circuit obstructs a fragment of said ablation path, wherein said tamper detection circuit remains intact, and wherein said incision enables a gas flow between a first side of said organic material and a second side of said organic material, wherein: said incision is formed by exposing said tamper detection circuit embedded in said organic material to an organic matter elimination mechanism, wherein said organic matter elimination mechanism eliminates organic matter while not eliminating inorganic matter.

2. The tamper detection system of claim 1 further comprising:
a wire trap affixed to said first side of said organic material adjacent said incision, wherein said wire trap comprises a tamper detection sensor and a bond component, wherein said tamper detection sensor is attached to said organic material via said bond component, and wherein said bond component physically separates said tamper detection sensor from said organic material.

3. The tamper detection system of claim 1 wherein:
said incision is formed by ablating said material multiple times, wherein a first ablation is laser-drilled on said first side of said organic material and wherein a second ablation is laser-drilled on said second side of said organic material.

4. The tamper detection system of claim 3 wherein:
an angle of said incision formed by said first ablation and said second ablation is between 60° and 120°.

5. The tamper detection system of claim 1 wherein:
said organic matter elimination mechanism is a laser tuned to ablate said organic material while not adversely affecting said tamper detection circuit, wherein said organic material in a drill path of said laser is removed, and wherein said tamper detection circuit in said drill path of said laser remains intact.

6. The tamper detection system of claim 1 further comprising:
a mechanical can, wherein said mechanical can includes a mechanical opening, and wherein said tamper detection circuit embedded in said organic material is affixed over said mechanical opening of said mechanical can.

7. The tamper detection system of claim 1 wherein:
said organic material and said tamper detection circuit embedded in said organic material fully encapsulate a protected volume.

* * * * *